United States Patent
Vogel et al.

[11] Patent Number: 6,049,359
[45] Date of Patent: Apr. 11, 2000

[54] INTERFACE SYSTEM FOR A TELEVISION RECEIVER

[75] Inventors: Jon Paul Vogel; Robin Bernard Rumbolt; Jeffrey Reed Lukkarila; Larry D. Johnson, all of Knoxville, Tenn.

[73] Assignee: Philips Electronics North America Corporation

[21] Appl. No.: 08/996,667

[22] Filed: Dec. 23, 1997

Related U.S. Application Data

[63] Continuation-in-part of application No. 08/931,061, Sep. 15, 1997, Pat. No. 5,748,255, which is a continuation of application No. 08/777,368, Dec. 27, 1996, abandoned, which is a continuation-in-part of application No. 08/362,037, Dec. 22, 1994, Pat. No. 5,592,234.

[51] Int. Cl.$^7$ ....................................... H04N 5/44
[52] U.S. Cl. ........................... 348/553; 348/725; 348/734
[58] Field of Search .................................... 348/553, 552, 348/569, 563, 564, 725, 734, 565, 836, 13; 358/188, 194.1; H04N 5/00, 5/44, 5/445, 5/45

[56] References Cited

U.S. PATENT DOCUMENTS

| | | |
|---|---|---|
| 4,161,728 | 7/1979 | Insam . |
| 4,337,480 | 6/1982 | Bourassin et al. ........................ 358/93 |
| 4,386,436 | 5/1983 | Kocher et al. ............................ 348/731 |
| 4,649,428 | 3/1987 | Jones et al. .............................. 358/188 |
| 4,789,860 | 12/1988 | Brennnand et al. ............... 340/825.51 |
| 5,274,455 | 12/1993 | Nishide et al. .......................... 358/188 |
| 5,283,638 | 2/1994 | Engberg et al. ........................... 348/14 |
| 5,359,367 | 10/1994 | Stockill .................................... 348/552 |
| 5,404,393 | 4/1995 | Remillard .................................. 379/96 |
| 5,621,482 | 4/1997 | Gardner et al. .......................... 348/725 |

FOREIGN PATENT DOCUMENTS 2620888 3/1989 France ............................. H04N 5/00

*Primary Examiner*—David E. Harvey
*Attorney, Agent, or Firm*—Edward W. Goodman

[57] ABSTRACT

An interface system for a television receiver includes an interface connector having a plurality of contacts connected to various component circuits in the television receiver. In order to provide various functions for the television receiver, the interface system includes various circuit boards each having a plug connectable with the interface connector. The plug includes a number of contacts equal to or less than the plurality of contacts in the interface connector. A particular embodiment of one of the circuit boards includes circuitry for connecting the television receiver to an interconnecting network and for enabling the television receiver to control, and to be controlled by, another television receiver also connected to the interconnecting network.

6 Claims, 5 Drawing Sheets

MENU

1 - AUDIO
2 - VIDEO
3 - TUNING
4 - CLOCK
5 - INPUTS
6 - CONTROL ANOTHER TV

FIG. 3A

OTHER TV'S ON NETWORK

| TV 2 | TV 3 |
| CHANNEL 6 | CHANNEL 5 |
| VOLUME XXXX......... | VOLUME MUTE |
| ON TIME 7:30 PM | ON TIME 6:00 PM |

CHANGE TV 2 ? PRESS ↑ TO CHANGE

CHANGE (USE CURSOR TO SELECT)
↓
CHANNEL   VOLUME   ON/OFF

FIG. 3B

INTERFACE SYSTEM FOR A TELEVISION RECEIVER

CROSS-REFERENCE TO RELATED APPLICATIONS

This application is a continuation-in-part of U.S. patent application Ser. No. 08/931,061 filed Sep. 15, 1997, now U.S. Pat. No. 5,748,255, which is a continuation of U.S. patent application Ser. No. 08/777,368, filed Dec. 27, 1996, now abandoned, which is a continuation-in-part of U.S. patent application Ser. No. 08/362,037, filed Dec. 22, 1994, now U.S. Pat. No. 5,592,234.

BACKGROUND OF THE INVENTION

1. Field of the Invention

The subject invention relates to television receivers and the various functionality options now available to a user.

2. Description of the Related Art

Television receivers that are being marketed today have various optional functions which may be incorporated therein. For example, the television receiver may include Picture-in-Picture (PIP) in which the video signal for PIP is provided by a second signal source (a VCR) connected to a second video input of the television receiver, or a second tuner so that the television receiver may by itself provide PIP. These and other optional features are provided by modifying the circuitry inside the television receiver. Quite naturally, these changes must be implemented in the production line resulting in a plurality of different models of the television receiver being fabricated. It should be apparent that this results in relatively high production costs. In marketing these separate models of television receivers, a dealer must then anticipate what features his/her customers would desire, and order sufficient quantities of the specific models. Any others must be ordered specifically for that consumer which may result in a lost sale.

In another situation, unless the particular model of television receiver in the user's possession has the appropriate features, the user must open up the television receiver, and cut into existing wiring so that the user may be able to adapt the television receiver for use with, for example, a computer.

One of the current uses for television receivers is as instructional aids in schools, wherein the television receiver is used in conjunction with a video cassette recorder or for viewing special programs broadcast from time to time. Heretofore, it has been necessary to specially modify each television receiver in order to interconnect the television receivers when it is desired to control the various television receivers from, for example, a central location. It has also been necessary to install cabling to interconnect the various television receivers.

SUMMARY OF THE INVENTION

It is an object of the subject invention to provide a standard television receiver which is easily adaptable for use in a network.

The above object is achieved in an interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, wherein said interface system comprises standard bus means having M leads separately connected to said audio signal processing circuit, said deflection circuit, said video signal processing circuit and said power supply circuit, where M is an integer greater than one; connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and wherein said standard bus means includes leads connected to said remote control receiver and to said microcomputer, characterized in that said circuit means on said circuit board means comprises an interface connector for connecting the circuit board means to interconnecting network; an interface circuit coupled to said interface connector for applying outgoing control data signals to and for receiving incoming control data signals from said interconnecting network; a microprocessor coupled to said interface circuit for supplying said outgoing data signals and for processing said incoming data signals, said microprocessor having a first memory coupled thereto for storing an operating program, and a second memory coupled thereto for temporarily storing data signals, wherein said microprocessor is coupled to said microcomputer and said remote control receiver via said plug means and said connector means, whereby depending on remote control signals received by said remote control receiver, said microprocessor sends control data signals through said interface circuit and said interface connector to said interconnecting network for controlling another television receiver connected to said interconnecting network, and whereby, depending on control data signals received on said interconnecting network through said interface connector and said interface circuit, said microprocessor causes said microcomputer to adjust said tuner, said audio signal processing circuit, and/or said video signal processing circuit, accordingly.

As shown in FIG. 1, the interface system of the subject invention allows a television receiver to be modified and/or upgraded to various different functionalities including, for example, CD-Video, CD-I, ghost cancellation, dual picture television, digital compressed video, and, in the present case, network interconnectivity.

It is a further object of the subject invention to provide a network for such standard television receivers which does not require extensive wiring of a facility.

The above object is achieved in an interface system as described above in which said interconnecting network is an a.c. power line, and said interface circuit is an a.c. line interface circuit, wherein said a.c. line interface circuit isolates the circuit board means from a.c. power on said a.c. power line.

BRIEF DESCRIPTION OF THE DRAWINGS

With the above and additional objects and advantages in mind as will hereinafter appear, the invention will be described with reference to the accompanying drawings, in which:

FIGS. 3A and 3B show illustrations of sample menus to be displayed in response to remote control transmitter inquiries;

DESCRIPTION OF THE PREFERRED EMBODIMENTS

Figure 2:
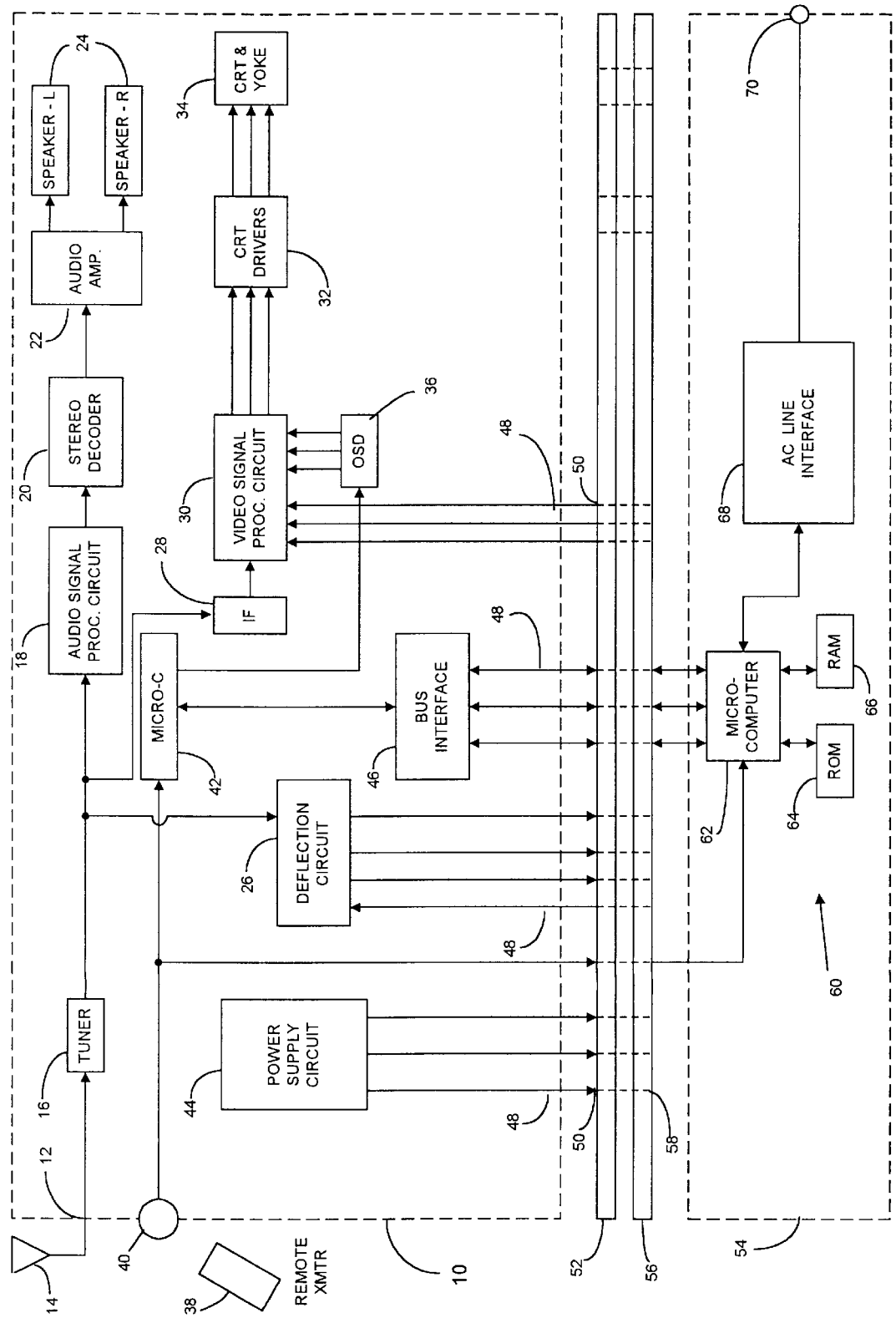
FIG. 2 shows, in block diagram form, a standard television receiver in which the interface system is used to provide a network interface and control.

FIG. 2 shows a standard television receiver 10 having an input 12 for receiving television signals from, for example, an antenna 14. The input 12 is connected to a tuner 16 for tuning the television receiver 10 to a particular television signal. The output from the tuner 16 is connected to an audio signal processing circuit 18 which separates an audio signal from the received television signal. An output from the audio signal processing circuit 18 is connected to a stereo decoder 20 which decodes the audio signal into separate left and right audio signals. A stereo audio amplifier 22 is shown which amplifies left and right audio signals for application to a left and a right speaker 24. The output from the tuner 16 is also applied to a deflection circuit 26 for generating deflection signals from synchronization signals contained in the television signal, and to an intermediate frequency stage (IF) 28 which converts the received television signal to a baseband CVBS signal. A video signal processing circuit 30 is provided for processing a baseband CVBS signal into component color signals (RGB) for application to cathode ray tube (crt) driver circuits 32 for driving a crt 34, which also receives the deflection signals from the deflection circuit 26. The video signal processing circuit 30 has an on-screen display circuit 36 connected thereto for providing video signals indicating messages for display on the crt 34. As noted in FIG. 2, an infrared remote control transmitter 38 is shown for interaction with a remote control receiver 40 in the television receiver 10. A microcomputer 42 is also shown connected to the remote control receiver 40 and controls the operation of the other elements in the television receiver 10, and in particular, the on-screen display circuit 36, in part, based on signals received by the remote control receiver 40. Finally, a power supply circuit 44 is shown which provides operating power to each of the above circuits. It should be noted that the connecting lines between these components have been omitted for clarity, any one skilled in the art would know how each of these circuits would be connected to the power supply circuit 44.

The subject invention includes the provision of a bus interface 46 in the television receiver 10 which is connected to the microcomputer 42, and a standard bus having lines 48 connected to each of the above-noted components, and in particular, the power supply circuit 44, the remote control receiver 40, the deflection circuit 26, the bus interface 46, the video signal processing circuit 30, the IF 28, the stereo decoder 20 and the stereo audio amplifier 22. These lines 48 are then connected to contacts 50 in an interface connector 52. A circuit board 54 is then provided with a plug 56 having contacts 58 for engaging with the contacts 50 in the interface connector 52. In particular, depending on the functionalities to be offered by the particular circuit board 54, various ones of the contacts 58 in the plug 56 are connected to circuits 60 mounted on the circuit board 54.

Figure 1:
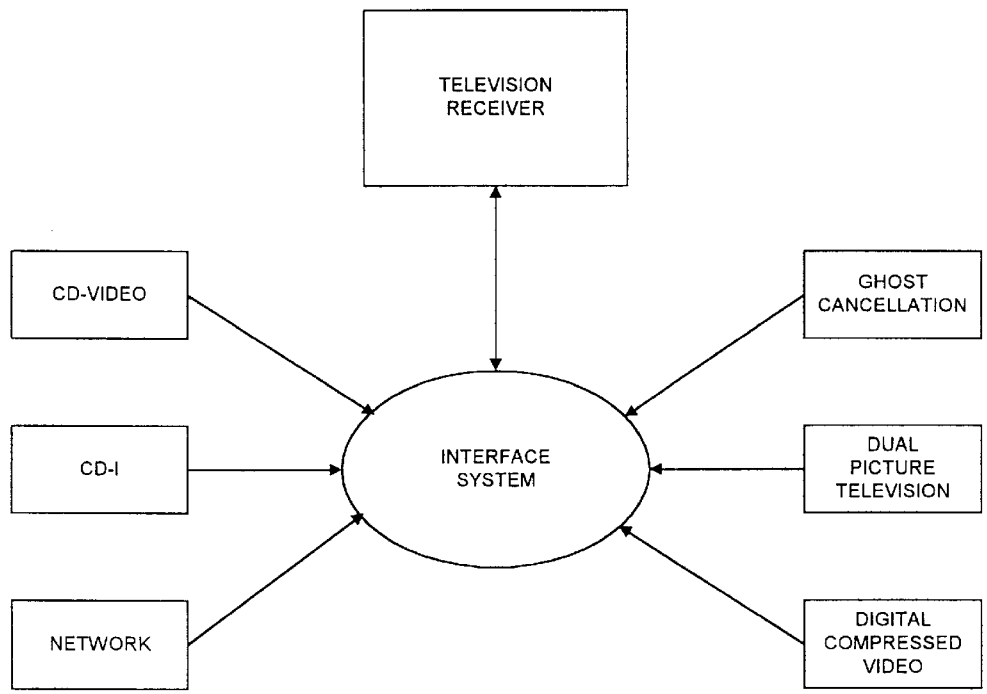
FIG. 1 shows various different applications for the interface system of the subject invention.
Figure 6:
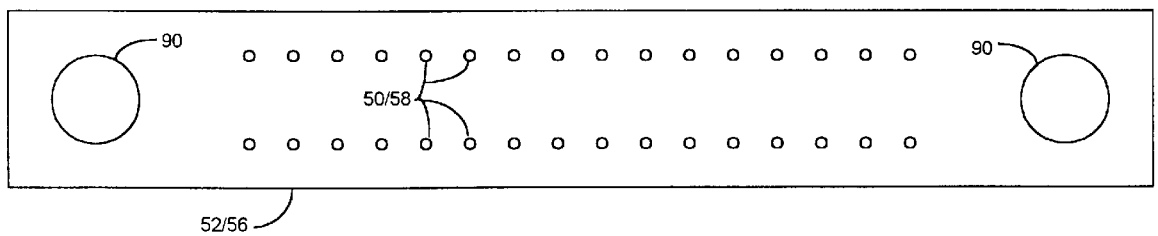
FIG. 6 shows an interface connector for use in the interface system.

FIG. 6 shows an example of the interface connector 52 (or plug 56) and shows contacts 50 (58) and holes 90 by which the connector 52 and the plug 56 may be fastened together.

In the embodiment shown in FIG. 2, the circuits 60 on the circuit board 54 enable a user of one television receiver to control the functions of another television receiver commonly connected to an interconnecting network. In particular, the circuits 60 include a microprocessor 62 having a read-only memory (ROM) 64 connected thereto containing the operating instructions for the microprocessor 62. In addition, a random access memory (RAM) 64 is also connected to the microprocessor 64 for temporarily storing data. The microprocessor 62 is coupled to the microcomputer 42 in the television receiver 10 through contacts 58 in the interface plug 56 connecting with contacts 50 in the interface connector 52 which, through the bus leads 48, are connected with the bus interface 46. In addition, the microprocessor 62 is similarly connected to the remote control receiver 40 in the television receiver 10.

The microprocessor 62 applies outgoing control data signals, and receives incoming control data signals, to an a.c. line interface circuit 68, which is connected to an a.c. power line via a connector 70. The a.c. line interface circuit 68, while isolating the circuits 60 from the a.c. voltage on the a.c. power line, applies an outgoing control signal carrier modulated by the microprocessor 62 onto the a.c. voltage, and separates incoming control data signals from the a.c. voltage, applying the incoming control data signals to the microprocessor 62.

While not specifically shown, the circuits 60 receive operating power as required from the power supply circuit 44.

When a user of the system desires to control the functions in another television receiver connected to the network, the user presses, for example, a menu button on the remote control transmitter. In addition to the ordinary functions to be controlled on this television receiver, an addition category is listed for controlling, for example, a remote television receiver.

Figure 4:
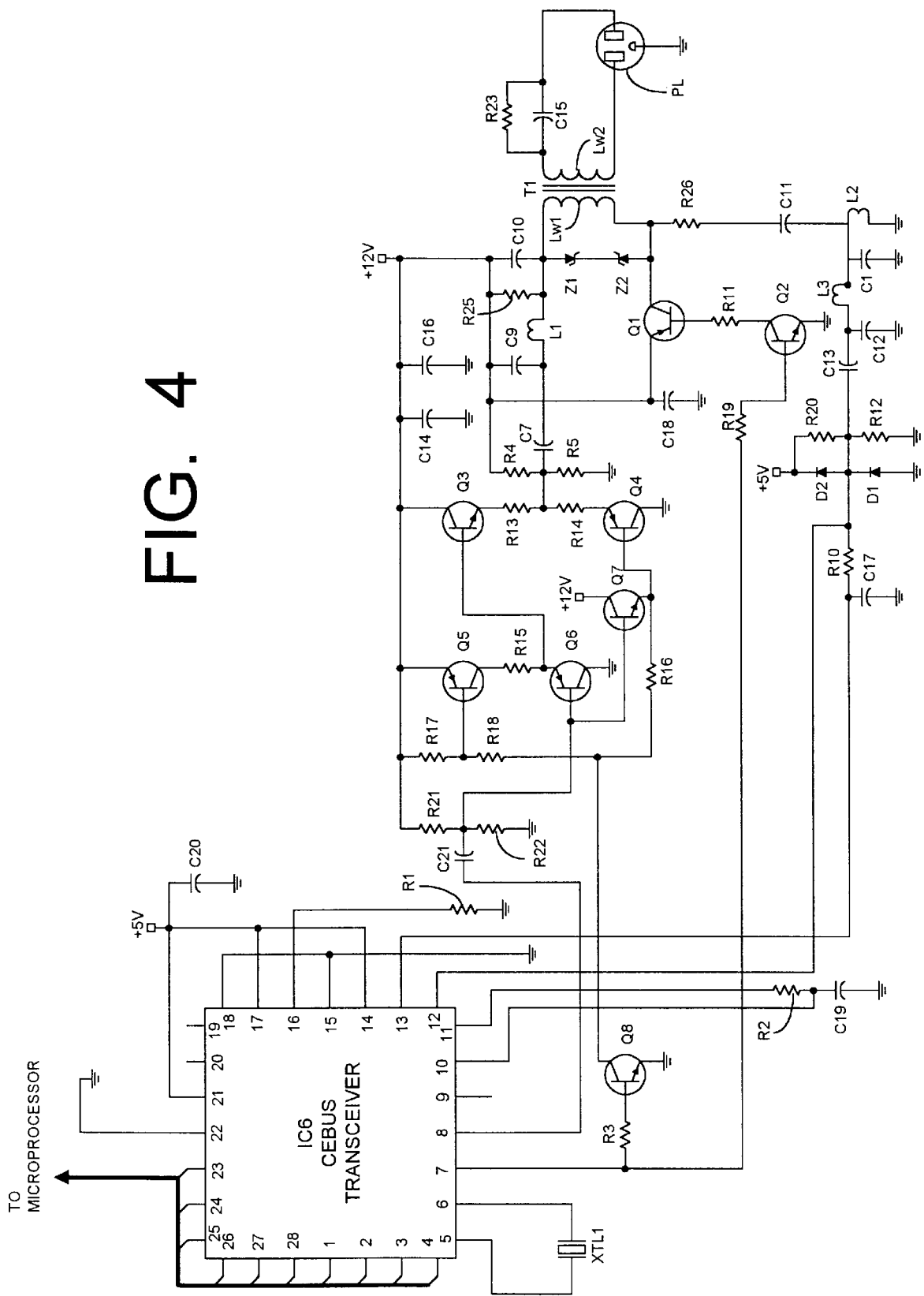
FIG. 4 shows a preferred embodiment of the a.c. line interface of the circuit board means of the subject invention.

FIG. 4 shows a preferred embodiment of the a.c. line interface circuit 68. In particular, a CEBus Transceiver IC6 is shown connected to the microprocessor 62. IC6 includes terminals and functions as shown in the following Table 1:

TABLE 1

| 1 | INT | 15 | VSSA |
| 2 | DA | 16 | BIAS |
| 3 | NC | 17 | VDDD |
| 4 | CD | 18 | VSSD |
| 5 | XIN | 19 | T8 |
| 6 | XOUT | 20 | T1 |
| 7 | TS | 21 | VDDA |

TABLE 1-continued

| 8  | SO   | 22 | CD    |
|----|------|----|-------|
| 9  | FS   | 23 | TX/RX |
| 10 | F3   | 24 | DCLK  |
| 11 | F2   | 25 | DO    |
| 12 | SI   | 26 | DI    |
| 13 | F1   | 27 | CLR   |
| 14 | VDDA | 28 | PTERM |

A 3.579 MHZ crystal oscillator XTL1 is connected between the terminal 5 and 6 of IC6. Terminals 7 and 8, carrying the outgoing control data signals, are connected to the primary winding Lw1 of transformer T1 via an output amplifier comprised of the transistors Q1–Q8, and the associated components connected thereto. The secondary winding Lw2 of transformer T1 is connected directly to one power plug PL contact, and via a filter circuit, including the parallel combination of resistor R23 and capacitor C15, to another power plug contact. The incoming control data signals are carried, from winding Lw1, via the series arrangement of resistor R26, capacitor C11 and the parallel arrangement (to ground) of inductor L2. A series arrangement of an inductor L3 and a capacitor C12 is arranged in parallel to the above parallel arrangement. The junction between the inductor L3 and capacitor C12 is connected by a capacitor C13 to junctions between resistors R20 and R12, and diodes D2 and D1, arranged between a +5v. supply and ground. The junction between the diodes D1 and D2 is further connected to ground by the series arrangement of a resistor R10 and a capacitor C17, in which the junction between the diodes D1 and D2 is connected to the terminal 12 of IC6 while the junction between the resistor R10 and the capacitor C17 is connected to the terminal 13. Terminals 1–4 and 23–28 of IC6 are then connected to the microprocessor 62.

Figure 5:
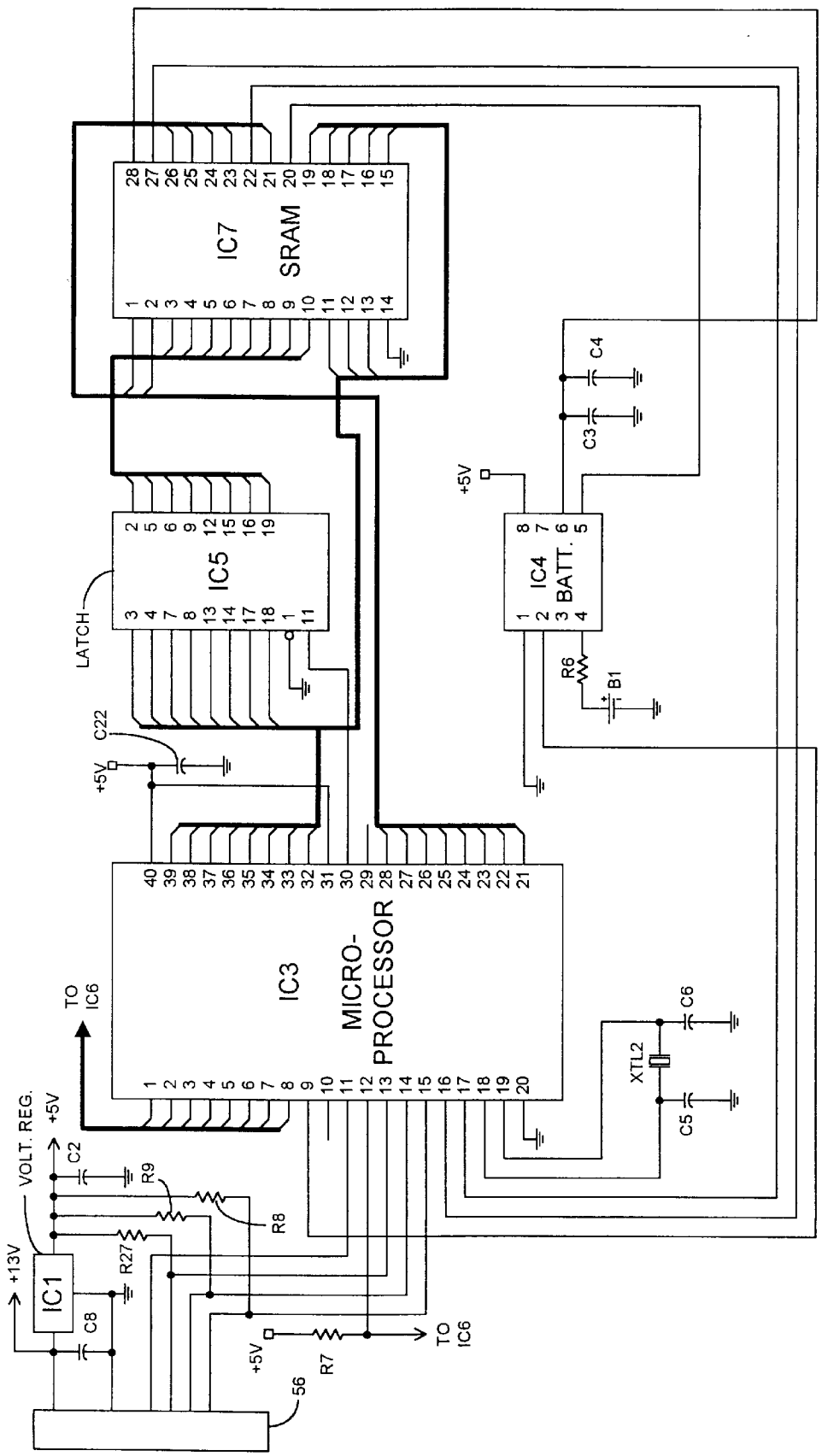
FIG. 5 shows a preferred embodiment of the circuit means for effecting the network interface and control.

FIG. 5 shows a preferred embodiment of the microprocessor 62. The microprocessor 62 is shown as microprocessor IC3 having terminals and functions in accordance with Table 2:

TABLE 2

| PIN NO. | FUNCT. | PIN NO. | FUNCT. | PIN NO. | FUNCT. | PIN NO. | FUNCT. |
|---------|--------|---------|--------|---------|--------|---------|--------|
| 1  | P1.0 | 11 | P3.1  | 21 | P2.0 | 31 | EA  |
| 2  | P1.1 | 12 | P3.2  | 22 | P2.1 | 32 | AD7 |
| 3  | P1.2 | 13 | P3.3  | 23 | P2.2 | 33 | AD6 |
| 4  | P1.3 | 14 | P3.4  | 24 | P2.3 | 34 | AD5 |
| 5  | P1.4 | 15 | P3.5  | 25 | P2.4 | 35 | AD4 |
| 6  | P1.5 | 16 | P3.6  | 26 | P2.5 | 36 | AD3 |
| 7  | P1.6 | 17 | P3.7  | 27 | P2.6 | 37 | AD2 |
| 8  | P1.7 | 18 | XTAL2 | 28 | P2.7 | 38 | AD1 |
| 9  | RST  | 19 | XTAL1 | 29 | PSEN | 39 | AD0 |
| 10 | P3.0 | 20 | VSS   | 30 | ALE  | 40 | VDD |

In this embodiment, the ROM 64 and RAM 66 are replaced by an SRAM IC7 which includes a battery back-up circuit IC4.

Terminal 11 of microprocessor IC3 is connected to the plug 56 and receives an output signal from the remote control receiver 40 in the television receiver 10, while terminals 13–15 of microprocessor IC3 are connected, through the plug 56, to the bus interface 46 in the television receiver 10. Terminals 32–39 of microprocessor IC3 are connected through octal latch IC5 to SRAM IC7, while terminals 16, 17 and 21–28 are connected directly to SRAM IC7. A battery backup circuit IC4 is connected to terminals 20 and 28 of SRAM IC7 and received a reset signal from terminal 9 of microprocessor IC3. The battery backup circuit IC4 supplies power to SRAM IC7 thereby retaining the data stored therein during times when the television receiver is turned off and power is not supplied to the microprocessor IC3 and the SRAM IC7 by the power supply circuit 44.

In the above embodiment, the various components have the following values:

| RESISTORS | |
|---|---|
| R1 | 5.1K OHMS |
| R2, R7, R8, R9, R10 | |
| R27 | 4.7K OHMS |
| R3, R19 | 3.3K OHMS |
| R4, R5, R21 | |
| R22 | 10K OHMS |
| R6, R25 | 1K OHMS |
| R11 | 220 OHMS |
| R12, R20 | 6.2K OHMS |
| R13, R14 | 13 OHMS |
| R15, R16 | 330 OHMS |
| R17 | 680 OHMS |
| R18 | 3.6K OHMS |
| R23 | 100K OHMS |
| R28 | 180 OHMS |
| CAPACITORS | |
| C1 | 330 pF |
| C2, C8, C16 | 10 $\mu$F |
| C3 | 47 $\mu$F |
| C4, C14, C18 | |
| C20, C21 | 0.1 $\mu$F |
| C5, C6 | 30 pF |
| C7, C22 | 1 $\mu$F |
| C9, C10 | 0.22 $\mu$F |
| C11 | 0.01 $\mu$F |
| C12 | 1500 $\mu$F |
| C13 | 3300 $\mu$F |
| C15 | 0.47 $\mu$F |
| C17, C19 | 680 pF |

-continued

| INDUCTORS | |
|---|---|
| L1 | 1.8 $\mu$H |
| L2 | 120 $\mu$H |
| L3 | 180 $\mu$H |
| TRANSISTORS | |
| Q1, Q4 | MPSW51A |
| Q2 | 2N3904 |
| Q3 | MPSW01A |

| | |
|---|---|
| Q5, Q6 | 2N3906 |
| Q7, Q8 | 2N3904 |
| DIODES | |
| D1, D2 | 1N914 |
| Z1, Z2 | 1N5336B |
| CRYSTALS | |
| XTL1 | 3.579 MHZ |
| XTL2 | 16.6520 MHZ |
| INTEGRATED CIRCUITS | |
| IC1 | VOLTAGE REGULATOR |
| IC3 | 82C528 |
| IC4 | BA6129AF |
| IC5 | 74HC373 |
| IC6 | CEBus TRANSCEIVER |
| IC7 | KM68257CJ-15 |

While the above-described embodiment uses the a.c. power lines as an interconnecting network for the television receivers, it should be understood that various other types of interconnecting networks may be used, including radio frequency (RF), infra-red, telephone lines, direct wiring, fibre optics, coaxial cable and ultrasonic. Depending on the interconnecting network, interface circuits other than a.c. line interface 68 may be required.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, wherein said interface system comprises:

standard bus means having M leads separately connected to said audio signal processing circuit, said deflection circuit, said video signal processing circuit and said power supply circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and wherein said standard bus means includes leads connected to said remote control receiver and to said microcomputer, characterized in that said circuit means on said circuit board means comprises:

an interface connector for connecting the circuit board means to interconnecting network;

an interface circuit coupled to said interface connector for applying outgoing control data signals to and for receiving incoming control data signals from said interconnecting network;

a microprocessor coupled to said interface circuit for supplying said outgoing data signals and for processing said incoming data signals, said microprocessor having a first memory coupled thereto for storing an operating program, and a second memory coupled thereto for temporarily storing data signals, wherein said microprocessor is coupled to said microcomputer and said remote control receiver via said plug means and said connector means, whereby depending on remote control signals received by said remote control receiver, said microprocessor sends control data signals through said interface circuit and said interface connector to said interconnecting network for controlling another television receiver connected to said interconnecting network, and whereby, depending on control data signals received on said interconnecting network through said interface connector and said interface circuit, said microprocessor causes said microcomputer to adjust said tuner, said audio signal processing circuit, and/or said video signal processing circuit, accordingly.

2. An interface system as claimed in claim 1, wherein on receipt of said remote control signals, said microprocessor causes said microcomputer to display a menu on said display of functions of another television receiver connected to said interconnecting network to be controlled.

3. An interface system as claimed in claim 1, wherein said interconnecting network is an a.c. power line, and said interface circuit is an a.c. line interface circuit, wherein said a.c. line interface circuit isolates the circuit board means from a.c. power on said a.c. power line.

4. Circuit board means for use in an interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, wherein said interface system comprises:

standard bus means having M leads separately connected to said audio signal processing circuit, said deflection circuit, said video signal processing circuit and said power supply circuit, where M is an integer greater than one; and connector means having M contacts connected, respectively, to said M leads in said standard bus means;

said circuit board means being accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and wherein said standard bus means includes leads connected to said remote control receiver and to said microcomputer, characterized in that said circuit means on said circuit board means comprises:

an interface connector for connecting the circuit board means to an interconnecting network;

an interface circuit coupled to said interface connector for applying outgoing control data signals to and for receiving incoming control data signals from said interconnecting network;

a microprocessor coupled to said interface circuit for supplying said outgoing data signals and for processing said incoming data signals, said microprocessor having a first memory coupled thereto for storing an operating program, and a second memory coupled thereto for temporarily storing data signals, wherein said microprocessor is coupled to said microcomputer and said remote control receiver via said plug means and said connector means, whereby depending on remote control signals received by said remote control receiver, said microprocessor sends control data signals through said interface circuit and said interface connector to said interconnecting network for controlling another television receiver connected to said interconnecting network, and whereby, depending on control data signals received on said interconnecting network through said interface connector and said interface circuit, said microprocessor causes said microcomputer to adjust said tuner, said audio signal processing circuit, and/or said video signal processing circuit, according to said received control data signals.

5. Circuit board means as claimed in claim 4, wherein on receipt of said remote control signals, said microprocessor causes said microcomputer to display a menu on said display of functions of another television receiver connected to said interconnecting network to be controlled.

6. Circuit board means as claimed in claim 4, wherein said interconnecting network is an a.c. power line, and said interface circuit is an a.c. line interface circuit, wherein said a.c. line interface circuit isolates the circuit board means from a.c. power on said a.c. power line.

* * * * *